United States Patent
Maeda et al.

(10) Patent No.: US 9,772,443 B2
(45) Date of Patent: Sep. 26, 2017

(54) LIGHTING PLASTIC OPTICAL FIBER AND METHOD OF MANUFACTURING SAME

(71) Applicant: Toray Industries, Inc., Tokyo (JP)

(72) Inventors: Hironobu Maeda, Nagoya (JP); Ryuichi Kamei, Nagoya (JP); Shinji Sato, Nagoya (JP)

(73) Assignee: Toray Industries, Inc. (JP)

( * ) Notice: Subject to any disclaimer, the term of this patent is extended or adjusted under 35 U.S.C. 154(b) by 15 days.

(21) Appl. No.: 15/032,081

(22) PCT Filed: Oct. 23, 2014

(86) PCT No.: PCT/JP2014/078175
§ 371 (c)(1),
(2) Date: Apr. 26, 2016

(87) PCT Pub. No.: WO2015/064459
PCT Pub. Date: May 7, 2015

(65) Prior Publication Data
US 2016/0259125 A1    Sep. 8, 2016

(30) Foreign Application Priority Data

Nov. 1, 2013   (JP) ................. 2013-227887

(51) Int. Cl.
| G02B 6/02 | (2006.01) |
| --- | --- |
| F21V 8/00 | (2006.01) |
| B29D 11/00 | (2006.01) |
| D01D 5/08 | (2006.01) |
| D01F 6/12 | (2006.01) |
| D01F 6/36 | (2006.01) |
| G02B 6/04 | (2006.01) |
| B29K 27/00 | (2006.01) |
| B29K 33/00 | (2006.01) |

(52) U.S. Cl.
CPC .... G02B 6/02033 (2013.01); B29D 11/00663 (2013.01); D01D 5/08 (2013.01); D01F 6/12 (2013.01); D01F 6/36 (2013.01); G02B 6/001 (2013.01); G02B 6/04 (2013.01); B29K 2027/14 (2013.01); B29K 2033/12 (2013.01)

(58) Field of Classification Search
CPC ...... G02B 6/02033; G02B 6/001; G02B 6/04; B29D 11/00663
See application file for complete search history.

(56) References Cited

U.S. PATENT DOCUMENTS

| 6,818,683 B2* | 11/2004 | Bodaghi | ........... D01D 5/08 385/143 |
| --- | --- | --- | --- |
| 2009/0279837 A1* | 11/2009 | Aoyagi | ........... G02B 1/045 385/128 |
| 2012/0243842 A1* | 9/2012 | Lin | ........... G02B 1/046 385/123 |
| 2014/0119698 A1* | 5/2014 | Sakabe | ........... G02B 6/4403 385/100 |

FOREIGN PATENT DOCUMENTS

| JP | 05-096095 U | 12/1993 |
| --- | --- | --- |
| JP | 05-341125 A | 12/1993 |
| JP | 06-118236 A | 4/1994 |
| JP | 06-331830 A | 12/1994 |
| JP | 07-063927 A | 3/1995 |
| JP | 09-506716 A | 6/1997 |
| JP | 09-258028 A | 10/1997 |
| JP | 2006-039287 A | 2/2006 |

* cited by examiner

*Primary Examiner* — Anne Hines
(74) *Attorney, Agent, or Firm* — DLA Piper LLP (US)

(57) ABSTRACT

An optical fiber is a linear radiator uniform in the longer direction thereof, and a lighting device uses the optical fiber. The optical fiber is a lighting fiber having a core and a cladding. In the fiber, as the cladding, there is used a polymer obtained by polymerizing a polymerizing ingredient containing 90% or more by weight of vinylidene fluoride, and the cladding has a crystallinity of 45% to 52%.

16 Claims, No Drawings

LIGHTING PLASTIC OPTICAL FIBER AND METHOD OF MANUFACTURING SAME

TECHNICAL FIELD

This disclosure relates to a lighting plastic optical fiber and a method of manufacturing the fiber; and a lighting plastic optical fiber bundle, an optical fiber lighting device, an optical fiber sensor, an optical fiber sheet, an optical fiber fabric, and an optical fiber knitting in each of which the optical fiber is used.

BACKGROUND

In any plastic optical fiber used for optical transmission, a core (inner layer) and a cladding (outer layer) each made of a clear resin are generally made into a form of concentric true circularities. In a plastic optical fiber having such a structure, light radiated from one of the ends of the fiber repeatedly undergoes total reflection at a phase boundary between the core and the cladding to be efficiently transmitted to the other end. Thus, the plastic optical fiber is effectively used as, for example, an endoscope for medical use, or an illuminating light-transmitting member for industry and automobiles. Any one of these members is used as a means to transmit light radiated from one end to the other end without leakage of light on the way. However, if this means can be caused to function as a linear radiator by causing light to leak from a middle (side surface) of the means in the longer direction thereof, the usage of the means can be developed for, for example, indoor and outdoor illumination, alternatives for neon signs or electrical displays and other decorations, and further to sensors.

As such a plastic optical fiber for side lighting, suggested is, for example, a side lighting optical fiber cable in which a light diffusion layer is formed as a layer outside a core and a cladding (for example, see Japanese Patent Laid-open Publication (JP-A) No. H05-341125 and JP-A No. H06-331830). However, formation of the light diffusion layer makes the side lighting optical fiber cable large in outer diameter, and further makes the cable high in elasticity. Consequently, there remain problems that the cable is low in bend nature, and is not easily handled or built for a specific usage.

In the meantime, as a plastic optical fiber for side lighting in which a means other than any light diffusion layer is used, for example, the following is suggested: a lighting plastic optical fiber in which the whole of a cladding or a desired region of a cladding from which light should be leaked is crystallized (see, for example, JP-A No. H06-118236). That technique applies a wet heat treatment to the whole of a cladding or a desired region of a cladding which should light, under wet heat conditions for crystallizing the whole or the desired region selectively. However, the cladding described in the specification thereof is poor in lighting performance.

A side light-leakage plastic optical fiber is also suggested in which a core has a noncircular cross-sectional form, and a cladding has a cross section in a truly circular form (see, for example, JP-A No. H09-258028). However, the optical fiber has problems that its lighting section is a partial region so that lighting therefrom is weak and further the fiber has, in accordance with a direction along which the optical fiber is viewed, a region which does not light. Furthermore, suggested is, for example, an optical fiber having an exposure region formed such that a cladding is removed to make a core exposed (see, for example, JP-A No. 2006-039287). However, that optical fiber has problems that the exposure region makes the plastic optical fiber low in mechanical strength and gives uneven lighting.

Thus, it could be helpful to provide a lighting plastic optical fiber from which light is emitted evenly in the longer direction of the fiber.

SUMMARY

We thus provide a plastic optical fiber including a core and a cladding and lights from a side surface of the fiber, wherein the cladding includes a polymer obtained by polymerizing a polymerizing ingredient containing 90% or more by weight of vinylidene fluoride, and the cladding has a crystallinity of 45% to 52%.

This results in a lighting plastic optical fiber from which light is emitted evenly in the longer direction; and a lighting plastic optical fiber bundle, an optical fiber lighting device, a plastic optical fiber sensor, an optical fiber sheet, an optical fiber fabric, and an optical fiber knitting in each of which the optical fiber is used.

DETAILED DESCRIPTION

The plastic optical fiber has a two-layer structure made of a clear resin of a core (inner layer) and a clear resin of a cladding (outer layer). A cross section profile thereof is a circle section.

Examples of the clear resin used for the core include polymethyl methacrylate (PMMA), any copolymer containing methyl methacrylate as a main ingredient, polystyrene, polycarbonate, polyorganosiloxane (silicone), and norbornene. Out of these examples, polymethyl methacrylate is a resin particularly preferred for the optical fiber from the viewpoint of transparency, refractive index, flexural properties, and heat resistance.

The clear resin used for the cladding needs to be a polymer obtained by polymerizing a polymerizing ingredient containing 90% or more by weight of vinylidene fluoride and having a crystallinity of 45% to 52%.

Examples of the polymerizing ingredient containing 90% or more by weight of vinylidene fluoride include simple vinylidene fluoride, vinylidene fluoride/tetrafluoroethylene, vinylidene fluoride/tetrafluoroethylene/hexafluoropropylene, vinylidene fluoride/hexafluoroacetone, and any other polymerizing ingredient from which a copolymer containing vinylidene fluoride is synthesized. In the copolymer, vinylidene fluoride as a copolymerizing ingredient is subjected to weight conversion. The above-mentioned polymer is in particular preferably a polymer obtained by polymerizing a polymerizing ingredient containing 95% or more by weight of vinylidene fluoride.

In using the polymer obtained by polymerizing a polymerizing ingredient containing 90% or less by weight of vinylidene fluoride as the cladding, the resultant optical fiber becomes small in light diffusion effect to be decreased in side lighting effect. Thus, the optical fiber is impaired in illumination function.

If the crystallinity is less than 45%, the optical fiber becomes small in light diffusion effect to be decreased in side lighting effect. If the crystallinity is more than 52%, the light diffusion effect is large but the fiber becomes too short in usable length to be unsuitable for practical use.

The crystallinity ranges preferably from 46% to 50% from the viewpoint of side lighting effect and practicality of the optical fiber.

When these resins are combined with each other for the core and the cladding, it is necessary to make a combination in which the refractive index of the resin used for the core is larger than that used for the cladding.

In connection with the respective refractive indexes of the core and the cladding, it is preferred to set a numerical aperture (N. A) represented by Expression (1) of 0.45 to 0.65.

The theoretical numerical aperture of the optical fiber is denoted by use of a difference in refractive index between the core and the cladding as represented by Expression (1):

$$\text{Numerical aperture} = ((\text{refractive index of core})^2 - (\text{refractive index of first cladding})^2)^{1/2} \quad (1).$$

About plastic optical fibers that have been put into practical use so far in which PMMA is rendered a core, the numerical aperture thereof is from 0.45 to 0.65. When the theoretical numerical aperture of an optical fiber to be produced is made consistent with this numerical aperture, the fiber can keep compatibility with light sources, luminous elements, and other peripheral members that have been put into practical use in the same manner.

The thickness of the cladding layer of the fiber is preferably 3.0 μm to 15.0 μm, more preferably 4.0 μm to 12.0 μm.

If the thickness is less than 3.0 μm, total reflection cannot be generated at the phase boundary between the core and the cladding so that the optical fiber lights from a side surface thereof and thus the fiber becomes short in usable fiber length, which is unsuitable for practical use. Moreover, the fiber is deteriorated in flexibility. If the thickness is more than 15.0 μm, light is largely absorbed into the cladding even when the above-mentioned polymer with high-crystallinity is used. Thus, the optical fiber is decreased in side lighting effect so that luminous unevenness is generated.

About the cladding used in the plastic optical fiber, in general, the melt flow rate (hereinafter, the rate may be abbreviated to MFR) value thereof is preferably 5 g/10 minutes to 100 g/10 minutes (conditions: a temperature of 230° C., a load of 3.8 kg, an orifice diameter of 2 mm, and a length of 8 mm). The MFR is in particular preferably 10 g/10 minutes to 60 g/10 minutes. When the MFR is 10 g/10 minutes to 100 g/10 minutes, the extrusion is facilitated and the spinning is smoothly advanced. By setting the MFR to 10 g/10 minutes to 100 g/10 minutes, the cladding layer can be formed with an even thickness while the layer can keep an appropriate adhesion to the core layer. Thus, the plastic optical fiber can be restrained from undergoing a variation in outer diameter.

The following will describe an example of a method of manufacturing the lighting plastic optical fiber.

The lighting plastic optical fiber can easily be manufactured by a conjugate spinning method through a core-sheath conjugate spinneret. About any optical fiber spun by this conjugate spinning method, the sectional shape of its core and that of its cladding can be made entirely equal to each other in any cross section in the longer direction of the optical fiber. Accordingly, the optical fiber can light evenly from the whole in the longer direction of the fiber.

To make the lighting more even, it is preferred that Expression (2) is satisfied by the conjugate melt spinning temperature (T) in a conjugate melt spinning for the core and the cladding at the time of the conjugate spinning, and the discharge rate (W) of the polymer of the cladding:

$$280 \leq T/W \leq 1500 \quad (2)$$

T is the temperature (° C.) for the spinning; and
W is the discharge rate (g/minute) of the polymer of the cladding.

If the T/W ratio is more than 1500, a difference in viscosity between the core and the cladding makes the phase boundary uneven so that the optical fiber becomes uneven in light reflectivity, absorbability, and diffusivity in the longer direction. Thus, the optical fiber tends to be reduced in side lighting effect to be uneven in lighting performance.

In the meantime, if the T/W ratio is smaller than 280, the optical fiber is reduced in side lighting effect even when a polymer having a high crystallinity is used. Thus, the optical fiber tends to be uneven in lighting performance in the longer direction of the fiber.

It is particularly preferred that the following is satisfied:

$$300 \leq T/W \leq 1000.$$

Subsequently, to improve a matter produced by the spinning in mechanical properties, the matter is subjected to an ordinary ranging processing to be extended 1.2 to 3 times. In this way, a plastic optical fiber is yielded. The plastic optical fiber usually has an outer diameter of 0.1 mm to 3 mm. It is advisable to select the outer diameter appropriately in accordance with a purpose of the fiber. The outer diameter is preferably 0.25 mm to 1.5 mm from the viewpoint of the handleability and the like.

The lighting plastic optical fiber is a side lighting optical fiber suitable for decorative use for illumination, clothing and others; industrial and household illuminations; and various sensors for industrial, medical and environmental uses and the like. The optical fiber is used in the state of radiating light into one of the end surfaces of the fiber to be leaked from a side surface of the fiber. In this way, indoor or outdoor places are illuminated, the shape or the presence of an object is made clear, or any destination or direction is shown. Furthermore, the optical fiber is used for various decorations or illuminations, or others, or used for a sensor for detecting any one of temperature, pressure and others.

The plastic optical fiber is generally used in the form of a sheet, or as one or more optical fiber bundles (each) obtained by making plural lines of the optical fiber into a bundle state. Examples of the "bundle state" include the state that lines of the plastic optical fiber are merely gathered, the state that the lines are twisted into a rope form or a cord or string form, the state that the lines paralleled into a sheet are rounded, the state that the gathered fiber lines are further gathered and bundled, and the state that these are twisted with each other. The number of the optical fiber bundles is selected at will. The number may be appropriately selected and changed in accordance with a purpose of the bundles. The number of lines of the plastic optical fiber used in each of the bundles is, for example, 5 to 200.

About such optical fiber bundles, it is preferred to use the bundles as a gathered product obtained by merely bundling two or more of these bundles further with each other. It is more preferred to divide lines of the plastic optical fiber into bundles in plural groups, and twist these bundles with each other at a twisting number of 1 to 20 per meter. The plastic optical fiber bundles having such a structure can make, through micro-bending, a further improvement in the lighting efficiency of the plastic optical fiber lines, and the bundles can be rendered a high-brightness lighting apparatus.

The optical fiber bundle may be inserted into a transparent tube or may be coated with a clear resin for protection. The material of the transparent tube is, for example, a transparent soft or flexible plastic material that is uncolored or colored. Specific examples of the material include vinyl chloride resin, acrylic resin, polycarbonate resin, polyester resin, polyvinyl acetate resin, and ethylene-vinyl acetate copolymer resin. To these main ingredients may be appropriately added a secondary material such as a plasticizer or an assistant.

The lighting plastic optical fiber is used in the state that a light source is connected to at least one of the ends of the fiber. Preferred examples of the light source include a metal halide lamp, a xenon lamp, a high pressure mercury lamp and an LED, each of which is particularly high in brightness. In accordance with a purpose of the optical fiber, the following may be appropriately changed: whether or not a reflector and a lens are fitted to the light source; the shape of the lamp; the power consumption thereof; and others.

The plastic optical fiber may be used as a sensor for various types of measurement such as temperature and pressure, or environmental measurement such as ammonia, humidity, oxygen, an alkane, gasoline vapor and the like.

The plastic optical fiber may be used as a sheet, a fabric and a knitting, or may be used as a pressure-sensitive sensor or a decoration.

The optical fiber sheet is formed by arranging lines of the optical fiber in a form like a plane, and gluing or fusing the lines to each other.

When the optical fiber is used as a fabric, known is an optical fiber fabric obtained by using the optical fiber as the warp, and weaving the optical fiber such that lines of the optical fiber are held by lines of thread and filling yarn lines arranged between the optical fiber lines. The optical fiber fabric may be, besides such a fabric, an optical fiber knitting obtained by knitting the optical fiber such that lines of the optical fiber are used as mono-filaments and further the optical fiber lines are held by warp-knitting.

It is advisable to use, as the optical fiber of the fabric or knitting, the abovementioned optical fiber and use, as the thread holding the optical fiber, a thread which is smaller in denier and more flexible than the optical fiber. It is preferred to use, for the thread, a synthetic fiber that is easily adjustable in denier and mechanical characteristics. However, it is allowable to use natural fiber, reclaimed fiber, or semisynthetic fiber besides any synthetic fiber. Examples of the synthetic fiber include olefin-based synthetic fibers; aliphatic polyamide synthetic fibers, a typical example thereof being nylon; and polyester synthetic fibers, a typical example thereof being polyethylene terephthalate (PET).

EXAMPLES

Hereinafter, our fibers and methods will be described in more detail by way of examples thereof. Evaluations were made by the following methods:

Fiber side illumination: As a light source, a halogen lamp (12 V, 100 W) was used, and the illumination of the surface of an optical fiber having a trial length of 5 m was measured at intervals of 1 m in the length direction of the fiber, using an illuminometer, "T-1M," manufactured by Minolta Co., Ltd.

The side illumination of each of four points in the circumferential direction of the fiber, which were located one meter apart from the light source for the fiber, was measured. The difference between the maximum of the measured values and the minimum thereof was defined as a variation in the side illumination, and the variation was used as an index of luminous unevenness.

Crystallinity: From an optical fiber, a cladding layer as the surface of the optical fiber was shaved off, and an X-ray diffraction apparatus, "D8 DISCOVER µHR Hybrid," manufactured by Bruker AXS GmbH was used to measure the crystallinity by a wide-angle X-ray diffraction method.

Cycle bending times: A load of 500 g was applied to one of the ends of a fiber, and the fiber was supported by a mandrel having a diameter of 20 mm. Using its supporting point as a center point, the other end of the fiber was continuously bent at an angle of 90°. The number of times of the bending to a breakage of the fiber was measured (the average of values measured 5 times (n=5)).

Melt flow rate (MFR): In accordance with Japanese Industrial Standards JIS K7210 (1999), the amount jetted out from a nozzle was measured for 10 minutes under the following conditions: a temperature of 230° C., a load of 3.8 kg, a nozzle diameter of 2 mm, and a nozzle length of 8 mm.

Refractive index: The refractive index of each of a core and a cladding was measured in an atmosphere of a room temperature of 25° C., using an Abbe refractometer (DR-M2, manufactured by Atago Co., Ltd.) as measurement equipment.

Core diameter and cladding thickness: Using a small measurement microscope (STM6, manufactured by Olympus Corporation) as a measurement instrument, the diameter of a core and the thickness of a cladding were each measured in an atmosphere of a room temperature of 25° C.

In working examples and comparative examples, substances constituting their core and cladding are described as follows:
PMMA: polymethyl methacrylate;
VDF: vinylidene fluoride; and
TFE: tetrafluoroethylene.

Example 1

As a cladding material, a VDF homopolymer (refractive index: 1.42) having a composition shown in Table 1 was supplied to a conjugate spinner. Furthermore, PMMA (refractive index: 1.492) produced by continuous bulk polymerization was used, as a core material, to be supplied to the conjugate spinner to form a core and a cladding by core-sheath conjugate melt spinning at a temperature of 220° C. In this way, a plastic optical fiber was yielded which had a fiber diameter of 1000 µm (core diameter: 980 µm, and cladding thickness: 10.0 µm).

The thus yielded plastic optical fiber was evaluated by the above-mentioned evaluating methods. The results are shown in Tables 2 and 3. From Tables 2 and 3, the optical fiber was good in both of side illumination and cycle bendability, and was also good in side illumination variation.

Examples 2 to 6

The respective cladding thicknesses in these examples were changed as shown in Table 1 (however, the respective fiber diameters therein were wholly unified to 1000 µm). In the same way as Example 1 except the change, plastic optical fibers were yielded. These plastic optical fibers were evaluated in the same way as in Example 1, and the results are shown in Tables 2 and 3.

Examples 2 to 4 and 6 were good in both of side illumination and cycle bendability. However, as for Example 5, a side illumination variation was large, and thus luminous unevenness of the fiber was observed.

Example 7

A plastic optical fiber was produced under the same conditions as in Example 6 except that the temperature at the time of the core-sheath conjugate melt spinning was changed to 240° C. This plastic optical fiber was evaluated by the above-mentioned evaluating methods, and the results are shown in Tables 2 and 3.

Example 8

A plastic optical fiber was manufactured by the same manufacturing method as in Example 1 except that the composition of the cladding material was changed as shown in Table 1. The plastic optical fiber was evaluated by the above-mentioned evaluating methods, and the results are shown in Tables 2 and 3. As is understood from Tables 2 and 3, this example was good in all of side illumination, side illumination variation, and cycle bendability.

Comparative Example 1

A plastic optical fiber was manufactured by the same manufacturing method as in Example 1 except that the composition of the cladding material was changed as shown in Table 1. The plastic optical fiber was evaluated by the above-mentioned evaluating methods, and the results are shown in Table 2. As is understood from Table 2, this example was low in side illumination and was also poor in cycle bendability.

Comparative Examples 2 and 3

The respective compositions of their cladding materials, and the respective thicknesses thereof were changed as shown in Table 1 (however, the respective fiber diameters were wholly unified to 1000 μm). In the same way as in Example 1 except the change, plastic optical fibers were produced. These plastic optical fibers were evaluated by the same evaluating methods as in Example 1, and the results are shown in Table 2. As is understood from Table 2, these examples were low in side illumination, and Comparative Example 3 was also poor in cycle bendability.

Comparative Example 4

A plastic optical fiber was produced under the same conditions as in Example 6 except that the temperature at the time of the core-sheath conjugate melt spinning was changed to 250° C. This plastic optical fiber was evaluated by the above-mentioned evaluating methods, and the results are shown in Table 2. As is understood from Table 2, this example was low in side illumination, and was also bad in cycle bendability.

TABLE 1

| | Core | | Cladding | | | MFR | Cladding | Fiber | Spinning conditions | | |
| --- | --- | --- | --- | --- | --- | --- | --- | --- | --- | --- | --- |
| | Composition (refractive index) | Core diameter (μm) | Composition (% by weight) | Refractive Index | Crystallinity (%) | (g/10 minutes) | thickness (μm) | diameter (μm) | Spinning temperature T (° C.) | Cladding polymer discharge rate (g/minute) | T/W |
| Example 1 | PMMA (1.492) | 980 | VDF = 100.0 | 1.420 | 47.0 | 22 | 10.0 | 1000 | 220 | 0.52 | 442 |
| Example 2 | PMMA (1.492) | 986 | VDF = 100.0 | 1.420 | 47.0 | 22 | 7.0 | 1000 | 220 | 0.37 | 595 |
| Example 3 | PMMA (1.492) | 992 | VDF = 100.0 | 1.420 | 47.0 | 22 | 4.0 | 1000 | 220 | 0.21 | 1048 |
| Example 4 | PMMA (1.492) | 976 | VDF = 100.0 | 1.420 | 47.0 | 22 | 12.0 | 1000 | 220 | 0.77 | 355 |
| Example 5 | PMMA (1.492) | 968 | VDF = 100.0 | 1.420 | 47.0 | 22 | 16.0 | 1000 | 220 | 0.82 | 268 |
| Example 6 | PMMA (1.492) | 995 | VDF = 100.0 | 1.420 | 47.0 | 22 | 2.5 | 1000 | 220 | 0.13 | 1692 |
| Example 7 | PMMA (1.492) | 995 | VDF = 100.0 | 1.420 | 51.5 | 22 | 2.5 | 1000 | 240 | 0.13 | 1846 |
| Example 8 | PMMA (1.492) | 980 | VDF/TFE = 91.2/8.8 | 1.415 | 45.4 | 25 | 10.0 | 1000 | 220 | 0.52 | 442 |
| Comparative Example 1 | PMMA (1.492) | 980 | VDF/TFE = 74.5/25.5 | 1.405 | 38.0 | 33 | 10.0 | 1000 | 220 | 0.54 | 407 |
| Comparative Example 2 | PMMA (1.492) | 968 | VDF/TFE = 74.5/25.5 | 1.405 | 38.0 | 33 | 16.0 | 1000 | 220 | 0.82 | 268 |
| Comparative Example 3 | PMMA (1.492) | 995 | VDF/TFE = 74.5/25.5 | 1.405 | 38.0 | 33 | 2.5 | 1000 | 220 | 0.13 | 1692 |
| Comparative Example 4 | PMMA (1.492) | 995 | VDF = 100.0 | 1.420 | 52.5 | 22 | 2.5 | 1000 | 250 | 0.13 | 1923 |

TABLE 2

| | Side illumination (Lx) Distance (m) from light source | | | | | | The number of cycle times to cycle bending breakage |
|---|---|---|---|---|---|---|---|
| | 0.5 | 1.0 | 1.5 | 2.0 | 2.5 | 3.0 | |
| Example 1 | 0.35 | 0.11 | 0.08 | 0.07 | 0.06 | 0.05 | 13,500 |
| Example 2 | 0.35 | 0.11 | 0.08 | 0.07 | 0.06 | 0.05 | 11,600 |
| Example 3 | 0.35 | 0.12 | 0.10 | 0.07 | 0.06 | 0.05 | 8,400 |
| Example 4 | 0.35 | 0.11 | 0.08 | 0.07 | 0.06 | 0.05 | 15,100 |
| Example 5 | 0.34 | 0.10 | 0.07 | 0.06 | 0.05 | 0.04 | 18,800 |
| Example 6 | 0.36 | 0.10 | 0.07 | 0.06 | 0.05 | 0.04 | 5,800 |
| Example 7 | 0.34 | 0.10 | 0.06 | 0.05 | 0.04 | 0.03 | 5,500 |
| Example 8 | 0.34 | 0.10 | 0.07 | 0.06 | 0.05 | 0.04 | 10,500 |
| Comparative Example 1 | 0.03 | 0.01 | Undetectable | | | | 4,500 |
| Comparative Example 2 | 0.02 | Undetectable | | | | | 8,200 |
| Comparative Example 3 | 0.03 | Undetectable | | | | | 1,100 |
| Comparative Example 4 | 0.34 | 0.06 | 0.03 | 0.01 | Undetectable | | 4,500 |

TABLE 3

| | Side illumination (Lx) <distance from light source: 1 m> | | | |
|---|---|---|---|---|
| | Ave. | Min. | Max. | Variation R |
| Example 1 | 0.11 | 0.09 | 0.12 | 0.03 |
| Example 2 | 0.11 | 0.09 | 0.12 | 0.03 |
| Example 3 | 0.12 | 0.10 | 0.14 | 0.04 |
| Example 4 | 0.11 | 0.08 | 0.14 | 0.06 |
| Example 5 | 0.10 | 0.05 | 0.20 | 0.15 |
| Example 6 | 0.10 | 0.07 | 0.13 | 0.05 |
| Example 7 | 0.10 | 0.07 | 0.13 | 0.05 |
| Example 8 | 0.10 | 0.08 | 0.12 | 0.04 |
| Comparative Example 1 | 0.01 | Undetectable | 0.02 | — |
| Comparative Example 2 | Undetectable | | | |
| Comparative Example 3 | Undetectable | | | |
| Comparative Example 4 | 0.06 | 0.05 | 0.08 | 0.03 |

The invention claimed is:

1. A lighting plastic optical fiber comprising a core and a cladding and which lights from a side surface of the fiber, wherein the cladding comprises a polymer obtained by polymerizing a polymerizing ingredient containing 90% or more by weight of vinylidene fluoride, and the cladding has a crystallinity of 45% to 52%.

2. The lighting plastic optical fiber according to claim 1, wherein the cladding has a thickness of 3.0 μm to 15.0 μm.

3. A method of manufacturing the lighting plastic optical fiber according to claim 2, comprising: subjecting a material which is to be a core and a material which is to be a cladding to conjugate melt spinning, wherein the temperature (T) for the conjugate melt spinning and the discharge rate (W) of the polymer of the cladding satisfy Expression (1):

$$280 \leq T/W \leq 1500 \tag{1}$$

where T is the temperature (° C.) for the spinning; and
W is the discharge rate (g/minute) of the polymer of the cladding per line of the fiber.

4. A lighting plastic optical fiber bundle, comprising a plurality of bundled lines of the lighting plastic optical fiber according to claim 2.

5. An optical fiber lighting device, comprising the lighting plastic optical fiber according to claim 2, and a light source connected to at least one end of the plastic optical fiber.

6. An optical fiber sensor, comprising, in at least one portion thereof, the lighting plastic optical fiber according to claim 2.

7. An optical fiber sheet, comprising, in at least one portion thereof, the lighting plastic optical fiber according to claim 2.

8. An optical fiber fabric, comprising, in at least one portion thereof, the lighting plastic optical fiber according to claim 2.

9. An optical fiber knitting, comprising, in at least one portion thereof, the lighting plastic optical fiber according to claim 2.

10. A method of manufacturing the lighting plastic optical fiber according to claim 1, comprising: subjecting a material which is to be a core and a material which is to be a cladding to conjugate melt spinning, wherein the temperature (T) for the conjugate melt spinning and the discharge rate (W) of the polymer of the cladding satisfy Expression (1):

$$280 \leq T/W \leq 1500 \tag{1}$$

where T is the temperature (° C.) for the spinning; and
W is the discharge rate (g/minute) of the polymer of the cladding per line of the fiber.

11. A lighting plastic optical fiber bundle, comprising a plurality of bundled lines of the lighting plastic optical fiber according to claim 1.

12. An optical fiber lighting device, comprising the lighting plastic optical fiber according to claim 1, and a light source connected to at least one end of the plastic optical fiber.

13. An optical fiber sensor, comprising, in at least one portion thereof, the lighting plastic optical fiber according to claim 1.

14. An optical fiber sheet, comprising, in at least one portion thereof, the lighting plastic optical fiber according to claim 1.

15. An optical fiber fabric, comprising, in at least one portion thereof, the lighting plastic optical fiber according to claim 1.

16. An optical fiber knitting, comprising, in at least one portion thereof, the lighting plastic optical fiber according to claim 1.

* * * * *